Aug. 24, 1943.  N. K. CHANEY  2,327,842
PRODUCTION OF VALUABLE HYDROCARBONS
Filed March 31, 1938   2 Sheets-Sheet 1
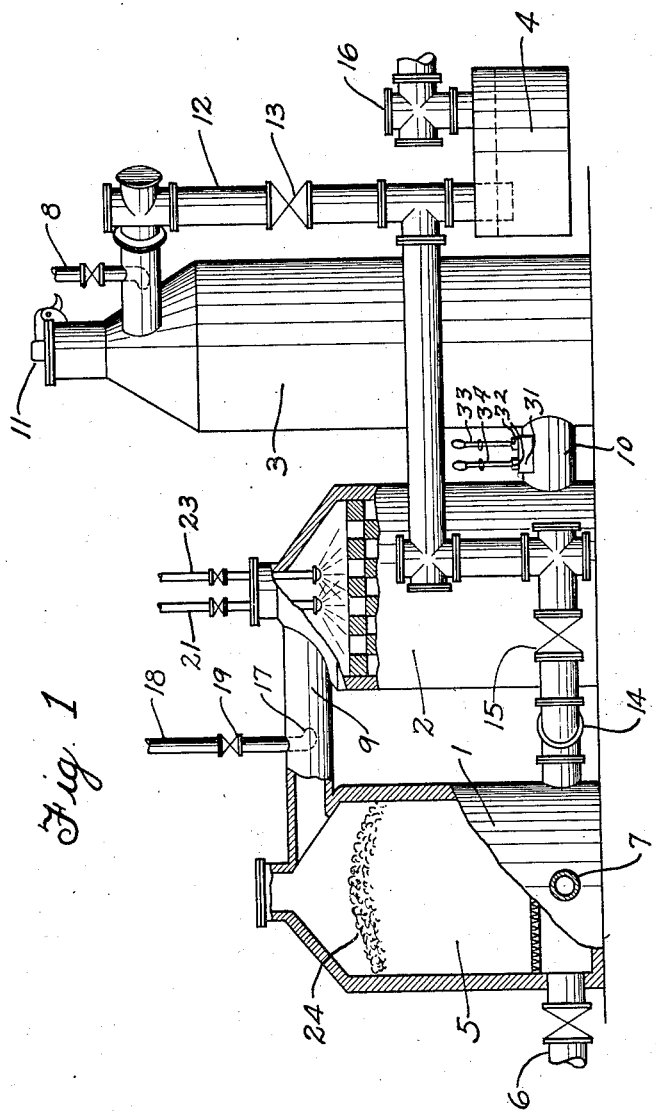
INVENTOR.
Newcomb K Chaney
BY Hugo G Kemman
ATTORNEY.

Aug. 24, 1943. N. K. CHANEY 2,327,842
PRODUCTION OF VALUABLE HYDROCARBONS
Filed March 31, 1938 2 Sheets-Sheet 2
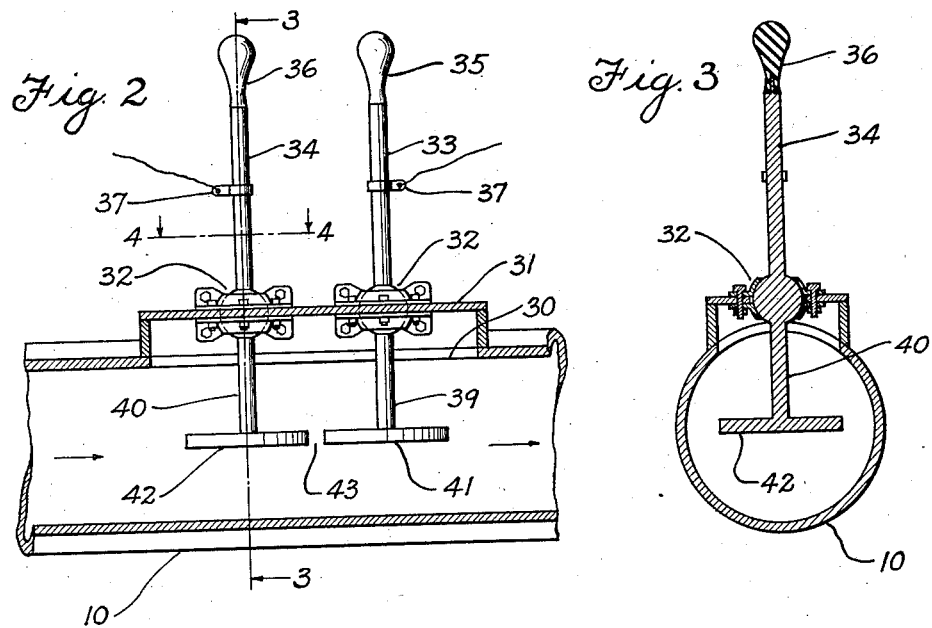
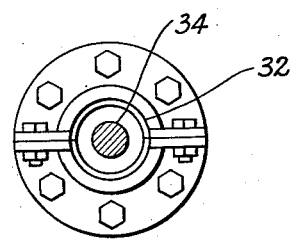
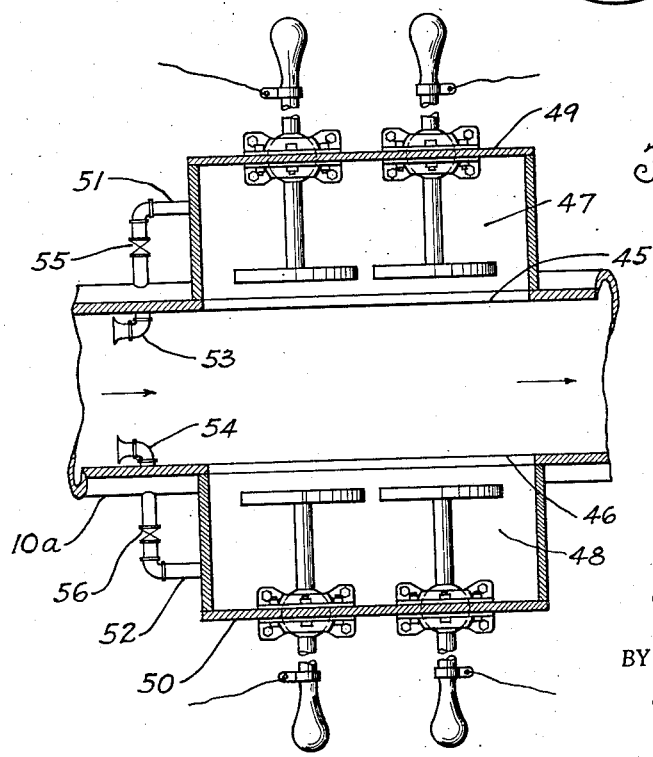
INVENTOR.
Newcomb K Chaney
BY Hugo G Kemman
ATTORNEY.

UNITED STATES PATENT OFFICE 2,327,842

PRODUCTION OF VALUABLE HYDROCARBONS

Newcomb K. Chaney, Moylan, Pa., assignor to The United Gas Improvement Company, a corporation of Pennsylvania Application March 31, 1938, Serial No. 199,115

7 Claims. (Cl. 204—168)

This invention pertains generally to the simultaneous production of manufactured gas and valuable hydrocarbons, and pertains particularly to a method for increasing the yields of desirable hydrocarbons.

For convenience, the invention will be described in connection with the manufacture of carburetted water gas, but it is to be understood that it may have other applications. For instance, it is equally applicable to the manufacture of oil gas.

A step in the manufacture of carburetted water gas involves the cracking of petroleum oil to form hydrogen and hydrocarbon gases for mixture with the ordinary blue gas produced by passing steam through the fuel bed.

While in normal practice by far the larger part of the petroleum oil, which customarily comprises the less costly fractions of the crude such as gas oil or heavy residuums, finds its way into fixed gas or in other words into gases which are liquefied with difficulty, such as hydrogen, methane, ethylene, and possibly other gaseous paraffins and olefins, there is nevertheless a certain portion of the oil used up in the production of water gas tar, drip oil, and lower temperature hydrocarbon condensates, the quantity of the latter recovered depending upon the final temperature to which the gas is reduced before delivery to a gas holder for distribution.

The tar, drip oil and lower temperature condensates contain a wide variety of hydrocarbons, the number and quantity of which vary with the final temperature to which the gas is subjected.

As an example, saturated and unsaturated hydrocarbons such as benzene, toluene, xylene, ethyl benzene, naphthalene, anthracene, indene, styrene, methyl styrene, cyclopentadiene, piperylene, butadiene, etc. might be detected in small quantities or recovered in substantial amounts. All of the hydrocarbons mentioned are valuable, the unsaturated compounds perhaps more so than the others because under normal operating conditions small quantities only are produced.

The unsaturated hydrocarbons are coming more and more into industrial demand, but their wide use is handicapped by limited sources of supply.

The economics involved in the production of manufactured gas are such that large volumes of gas should be produced in a minimum of time and with the least expenditure of heat. Therefore, although high temperatures are involved, and although some reactions may be sufficiently rapid to reach equilibrium, many of the reactions involved in the production of the more rare or valuable hydrocarbons are too slow to proceed to a large extent in the permitted time. Increase in time is not helpful since at the temperatures involved this has the tendency to destroy other valuable products after they have been formed.

I have discovered that many of the desirable reactions may be very materially speeded up by introduction of suitable catalysts into the gas stream.

For instance the reaction $$C_6H_5CH_2CH_3 \rightarrow C_6H_5CH=CH_2 + H_2$$

is greatly speeded up by the presence of materials such as the oxides of calcium, strontium, manganese, zirconium, etc. The same applies to other alkylated benzenes for instance isopropyl benzene.

The compound $C_6H_5CH=CH_2$ is known as styrene and is one of the most valuable materials present in gas condensates.

A reaction taking place in the gas stream with the production of ethyl benzene is the following:

$$C_6H_6 + C_2H_4 \rightarrow C_6H_5CH_2CH_3$$

This reaction is catalyzed by anhydrous aluminum chloride.

Divinyl benzene is formed by the following series of reactions.

$$C_6H_6 + 2CH_2=CH_2 \rightarrow C_6H_4(C_2H_5)_2$$
$$C_6H_4(C_2H_5)_2 \rightarrow C_6H_4(CH=CH_2)_2 + 2H_2$$

The second step is catalyzed by either zinc oxide or anhydrous aluminum chloride.

Many other reactions between materials present in the gas stream may be catalyzed with the formation of more valuable products.

For instance it has been stated (1) that ethylene, propene, butadiene, isoprene and higher olefins may be obtained from methane using a catalyst comprising copper oxide and carbon; (2) that benzene and toluene may be produced from butane in the presence of catalysts such as iron and nickel; (3) that butadiene may be obtained from butene using magnesium oxide as a catalyst; (4) that diphenyl may be prepared from benzene using a nickel-chromium catalyst; etc.

Other features of the invention reside in the steps, combinations of steps, and sequences of steps, and in the construction, arrangement and combination of parts, all of which together with other features will become more apparent to persons skilled in the art as the specification proceeds and upon reference to the drawings in which:

Figure 1 is an elevation, partly in section illustrating a conventional 3 shell water gas set with the invention adapted thereto;

Figure 2 is a section shown broken of the connection between the carburetter and superheater of Figure 1;

Figure 3 is a section on line 3—3 of Figure 2;

Figure 4 is a section on line 4—4 of Figure 2; and

Figure 5 is a section shown broken illustrating a modification.

Referring more particularly to Figure 1, 1 indicates a generator, 2 a carburetter, 3 a superheater and 4 a wash box.

Generator 1 is illustrated as having a fuel bed 5, an up run air blast supply 6, and an up run steam supply 7.

Superheater 3 is shown with a down run steam supply 8.

Generator 1 is provided at its top with an off-take 9 leading to the top of the carburetter 2, and carburetter 2 is provided at its base with an off-take 10, leading to the base of the superheater 3.

Superheater 3 is shown with a stack valve 11 and a gas off-take 12, the latter leading to wash box 4 through valve 13.

Generator 1 has a gas off-take 14 at its base provided with valve 15. Gas off-take 14 leads to wash box 4.

Wash box 4 is shown with the conventional gas off-take 16.

The apparatus so far particularly described is entirely conventional in character. Any other gas making equipment employing a run with oil might have been substituted for the purposes of describing the invention.

The operation of the apparatus so far referred to will be described with a conventional cycle.

The fuel bed 5 is blasted with air supplied at 6. This raises the temperature of the fuel bed and generates producer gas which is burned as it flows through the set by secondary air introduced at 17 through pipe 18 controlled by valve 19.

The hot blast gases pass down through the carburetter 2 and up through superheater 3 raising the temperature of the carburetter and superheater and storing heat therein, and finally escape through stack valve 11.

The following table will illustrate a common swing in temperatures at various points in a set during a typical blast.

Table 1

| Point in set | Temperature °F., start of blast | Temperature °F., end of blast |
| --- | --- | --- |
| Carburetter top | 1,250 to 1,350 | 1,600 to 2,000 |
| Carburetter middle | 1,275 to 1,375 | 1,500 to 1,700 |
| Superheater base (also carburetter base) | 1,300 to 1,400 | 1,325 to 1,425 |
| Superheater middle | 1,325 to 1,375 | 1,335 to 1,385 |
| Superheater top | 1,275 to 1,325 | 1,275 to 1,325 |

After the air blasting operation the set is purged of blast gases by steam admitted at 7, whereupon stack valve 11 is closed, valve 13 is opened and an uprun is made with steam supplied at the same point. The blue water gas thus made passes through carburetter 2, superheater 3, wash box 4, and flows out through off-take 16.

During this uprun with steam oil is introduced into the set for cracking and fixing in the carburetter and superheater.

Although the point of introduction of oil may vary in different gas making equipment, for convenience in description I have illustrated an oil spray 21 at the top of carburetter 2.

Irrespective of the construction of the inside of the carburetter, which may vary widely in different types of apparatus, it is customary to have a substantial part of this oil come directly into contact with the heated surfaces, whether they be of checkerbrick or of other construction or comprise merely the side walls. However, whether coming into contact with the heated surfaces or not this oil is subjected to the temperatures of the carburetter and superheater as it is carried along by the stream of blue water gas, and is cracked into gas, coke, tar, drip oil and other condensates. The coke is usually deposited in the carburetter and superheater and the condensates are usually carried out of the superheater and are condensed at the wash box or further on in other condensing equipment.

After the uprun, valve 13 is closed, valve 15 opened and steam is reversed through the set by admitting it at 8. This steam is superheated in the superheater and carburetter and is passed down through the fuel bed generating water gas which passes through off-take 14 directly to the wash box 4.

It is common practice to also introduce oil into this back run, for instance, at the top of the carburetter as at 21, or at the top of the generator, or even at the top of the superheater. This oil or its decomposition products is carried down through the fuel bed 5 by the steam where it is cracked into hydrogen and hydrocarbons for carburetting the water gas simultaneously formed by interaction of the steam and the carbon of the fuel bed. Some of these hydrocarbons are likewise condensed at the wash box or further on in other condensing equipment.

To complete the cycle the reverse run with steam is followed by an up run purge with steam.

It is, of course, understood that any other cycle might be substituted.

The conditions in the carburetter as well as in the superheater during the up run are such that a wide variety of reactions are possible between the various hydrocarbons present, saturated and unsaturated.

Examples of possible reactions have already been given.

In the normal operation of a set for the production of manufactured gas no special catalytic materials are introduced, and it is to the introduction of special catalytic materials that this invention is directed.

There are wide ranges of catalysts that might be employed depending upon the results desired. A difficulty, however, presents itself as to the practicable introduction and use of catalysts in a gas making operation.

Practically all known materials including all of the elements, their oxides and other compounds, vaporize at the temperatures of the carbon arc. In fact certain substances are so refractive as to be non-vaporizable by other means.

I find this fact to be especially useful in the dispersion of catalyst in finely divided form throughout the highly heated gas while the foregoing reactions are taking place. This may be accomplished for instance by incorporating any desired catalyst in the carbon electrodes of a carbon arc placed within the gas.

The manufacture of carbon electrodes having incorporated therein other substances is well understood by persons skilled in that particular art, and the prior art is replete with methods and apparatus for this purpose.

The desired catalyst having been incorporated in the carbon electrodes it merely remains necessary to operate the arc in the gas stream while the foregoing reactions are taking place.

The catalyst is at first vaporized by the very high temperatures of the carbon arc and this vapor diffuses throughout and is mixed with the gas stream. Since the temperatures of the reacting gases are below the condensing or freezing temperatures of the catalysts usually employed, the catalyst vapors upon cooling are transformed into widely dispersed, discrete catalyst particles which are carried along by the gas stream. These particles catalyze the desired reactions thus increasing the yield of the desired products.

A part of these widely dispersed catalyst particles is deposited on the checkerbrick of the carburetter and/or superheater, depending of course upon the position of the carbon arc, and the rest is carried out of the superheater with the gas and is deposited further on in the gas making equipment such as in the wash box.

That portion of the catalyst which is deposited on the checkerbrick if not poisoned or coated with carbon assists in catalyzing the desired reactions.

While any means may be employed for striking and operating the arc or arcs at any desired point or points in the gas stream, such as in the carburetter and/or superheater and/or down stream from the superheater and/or in the back run pipe down stream from the generator, for the purposes of illustration I have shown in Figure 2 the installation of an arc in pipe 10 which connects the base of carburetter 2 with the base of superheater 3.

Pipe 10 is shown with an opening 30 in its side wall which is closed by a plate 31 in which is pivoted, by means of ball and socket joints illustrated at 32, a pair of electrode supports 33 and 34 having insulated operating handles 35 and 36 respectively.

Each electrode support is illustrated with a means 37 for connecting it into an electrical circuit.

It will be noted that the manner of mounting electrode supports 33 and 34 permits the supports to be moved angularly in any direction as well as to be rotated.

Mounted on the inner ends 39 and 40 of electrode supports 33 and 34 are electrodes 41 and 42 respectively. These electrodes are shown shaped in the form of discs which are axially mounted on their respective supports.

This arrangement of the electrodes 41 and 42 not only permits the flow of gases with very little resistance, but also tends to protect the arc, which will be positioned at the point 43, from being extinguished by the rapidly moving gases.

To strike the arc it is merely necessary to bring the discs 41 and 42 together by means of handles 35 and 36 and to separate them in a manner well understood in the operation of carbon arcs. Any suitable indicating device such as an ammeter (not shown) may be connected in the circuit to show whether the arc is in operation.

The vaporized catalyst produced at the point 43 by the arc diffuses out into the gas stream and becomes thoroughly mixed therewith.

As the carbon is burned away at opposite points on the discs 41 and 42, these discs may be revolved by means of the handles 35 and 36 to bring new electrode material into the arc. Discs 41 and 42 may be revolved any desired number of times and until they require replacement. The very large amount of electrode material embodied within these discs greatly extends the period between necessary replacement of electrodes.

Should it be desired to remove the electrodes from the gas stream this may be accomplished in any convenient manner, for instance, as illustrated in Figure 5 wherein pipe 10a is shown provided with a pair of oppositely arranged openings 45 and 46 which extend outward sufficiently to form a pair of electrode housings 47 and 48 the ends of which are shown closed by plates 49 and 50 respectively.

Each plate 49 and 50 is illustrated as having mounted therein a pair of electrodes the construction and arrangement as illustrated being in all respects similar to that of plate 31 and its appurtenances illustrated in Figure 2.

The electrodes in each plate 49 and 50 may be operated in all respects similar to those in plate 31 of Figure 2.

Should it be desired to avoid the accumulation of vaporized catalyst in housings 47 and 48 it is merely necessary to wash catalyst vapors from these housings, continuously or intermittently, for instance, by means of gas bypasses 51 and 52 having open ends 53 and 54 projecting upwardly into the gas stream so that a part of the gas will flow into the openings.

The flow of gas through bypasses 51 and 52 may be conveniently controlled by valves 55 and 56 respectively.

The catalyst after being vaporized diffuses or is washed into the gas stream and is mixed therewith and acts in all respects as previously described.

It will be seen that the pairs of electrodes in Figure 5 might be staggered longitudinally in pipe 10a with respect to each other, if desired. Furthermore, it will be seen that any number of pairs of electrodes might be installed at any desired number of points.

While the hydrocarbons produced during the backrun are, generally speaking, of lower molecular weight than those produced during the uprun, nevertheless, electrodes might be employed in these gases, for instance, by installation in take-off pipe 14. On the other hand the electrodes may be placed in the gas of the runs after it is mixed, but, of course, while it is still in a reactive state.

Should it be desired to install electrodes down stream of the superheater 3 this might be conveniently done in pipe 12.

Should it be desired to install electrodes intermediate the ends of the carburetter or the superheater this may be done through man-holes, mounting the electrodes in the cover plate much the same as has been done in Figures 2 and 5. If desired such openings might be lined with refractory materials and/or the electrode supports might be coated therewith if found necessary or desirable. As a rule, however, the temperatures of the carburetter and superheater are not so high as to high as to prevent the use of exposed high melting metal alloys.

Means for adapting my invention to other types of gas making equipment will suggest themselves to persons skilled in the gas making art upon becoming familiar herewith.

Likewise, means for adapting my invention to high pressure cracking operations, and particularly to vapor phase and mixed phase cracking operations will suggest themselves to persons skilled in that particular art upon becoming familiar herewith.

For instance, electrodes might be installed in reaction or soaking drums or chambers or at any other point or points.

Therefore, although it has been convenient to describe the invention in connection with a conventional water gas set, it is to be understood that this is not by way of limitation, and that the invention may be applied to the cracking of petroleum oil in general.

Any means for heating the carburetter may be substituted for the fuel bed 5, such as an oil burner, a tar burner, or even a gas burner. An up blast might be used to carry this heat over into the carburetter and superheater much the same as is done when a fuel bed is used, except that secondary air might or might not be employed.

Since when the fuel bed 5 is substituted by an oil, tar or gas burner there is no, or at least very little, carbon to be reacted with steam to form carbon monoxide and hydrogen in the generator, or in other words ordinary blue water gas, the blue gas runs with steam up run and back run are omitted, leaving an oil up run preferably with steam in the absence of blue gas to follow the blast run. Or, if desired, such a cycle might be followed even when the fuel bed 5 is employed.

In such case only a small amount of steam, that is, just sufficient to react with the carbon deposited in the carburetter and superheater as a result of cracking of the oil, might be employed.

On the other hand, to obtain low partial pressures to assist in vaporizing and cracking the oil, for instance partial pressures of the order obtaining in the manufacture of carburetted water gas, I may inject sufficient steam, such as through 23 at the top of carburetter 2, during the injection of oil to accomplish this result.

As an illustration, to obtain a reduction in partial pressure of oil vapors comparable to that obtained during a forward carburetted water gas run as a result of the presence of ordinary blue gas, namely carbon monoxide and hydrogen, I may inject sufficient steam (or water) at 23 to obtain this end. Generally speaking, the volume of steam would be comparable to the volume of blue gas to obtain comparable partial pressures of oil vapors.

However, I may operate at any other desired partial pressure of oil vapors say for instance between 3 and 10 pounds per square inch.

As an illustration when it is desired to hold the partial pressure of oil vapors at approximately 5 pounds per square inch the volume ratio of steam to oil vapors is approximately 2 to 1. It will be readily understood that in this example the total pressure is approximately atmospheric.

The invention might be applied to any other gas operation such as to the manufacture of coal gas or even producer gas if desired for any reason.

My invention serves as an excellent means for obtaining radiations or vibrations of many frequencies capable of photochemical effects in the gas stream. This result may be obtained, if desired, quite independently of whether or not a catalyst is employed.

By a proper selection of the required materials to be incorporated in the carbon electrodes radiations of many desired frequencies or band of frequencies may be obtained for activation or ionization of the molecules and to cause them to unite.

A wide range of materials which may be incorporated in carbon arcs for obtaining radiations of desired frequencies are well known in the art. Examples are the various metals. Such materials themselves may or may not act as catalysts in the gas stream.

In this way radiations are obtained which could not otherwise be obtained except by using much higher temperatures. Very high temperatures are to be avoided in the production of valuable hydrocarbons since very high temperatures break down the desired products.

When employing my process as just described desired photochemical effects may be obtained without the undesirable effects which would otherwise result from raising the entire mass of reactants to very high temperatures, since the very high temperatures accompanying the radiations are confined more or less closely to the region of the arc itself with which only a small portion of the total gas comes into actual contact.

While I have described my invention in connection with movement of the electrodes for striking the arc, it is to be understood that the arc may be struck in any other manner, for instance, such as by a high voltage discharge, the operation of which is well understood by persons skilled in the art.

Furthermore, the catalyst or catalysts may be divided between the electrodes in any desired manner or all of the catalyst or catalysts may be incorporated in only one of the electrodes of the arc. Therefore, while it is simpler to have both electrodes of an arc of the same composition this is by no means a necessary feature.

Moreover the catalytic material itself, that is without admixture, may comprise one or even both of the electrodes. In other words the incorporation of the catalytic material with other material such as carbon is not an indispensable feature.

When the catalytic material is incorporated with other material such as carbon it may be in the free state or may be chemically combined.

Although the invention has been described in connection with the pyrolytic decomposition of petroleum oil it is to be understood that other hydrocarbon materials might be used such as tar (of which coal tar, water gas tar, and oil gas tar are examples) and hydrocarbon gases (of which natural gas and refinery gas obtained in the production of motor fuels by cracking petroleum oil are examples).

It is to be understood that the material supplied to the electric arc to supply the catalyst need not be the catalyst itself, but may be a material or materials from which the desired catalyst is produced under the existing conditions.

Other variations will suggest themselves to persons skilled in the art upon becoming familiar with this invention.

While the operation of the invention has been described chiefly in connection with vaporization of the catalyst followed by condensation and/or solidification, it is to be understood that the disruptive forces of the flow of current across an electric arc might disperse some catalyst in the solid and/or liquid phase. Furthermore, in the case of the so-called gaseous catalysts condensation and/or solidification obviously need not follow vaporization.

Having described my invention particularly, it will be understood that this is by way of illustration, and that changes, omissions, additions, substitutions, and/or modifications might be made within the scope of the claims without departing from the spirit of the invention which is intended to be limited only as required by the prior art.

I claim:

1. In the pyrolysis of hydrocarbon material in vapor phase with the production of valuable hydrocarbons, the step comprising favoring a hydrocarbon-producing reaction involved in said pyrolysis by contacting said vapor phase material undergoing pyrolysis with a catalyst for said hydrocarbon-producing reaction by dispersing said catalyst in finely divided form in said vapor phase material by means of an electric arc, while minimizing the heating effect of said arc upon the vapor phase material involved in said pyrolysis by contacting said arc with less than the preponderant portion of said vapor phase material.

2. In the vapor phase pyrolysis of petroleum oil with the production of valuable hydrocarbons, the steps comprising favoring a hydrocarbon-producing reaction involved in said pyrolysis by contacting the vapor phase material undergoing pyrolysis with a dispersion in said vapor phase material of a catalyst for said reaction said catalyst being dispersed as vapor by means of an electric arc, and minimizing hydrocarbon decomposition as a result of exposure to high arc temperatures by contacting said arc with less than the preponderant portion of said vapor phase material.

3. In the vapor phase pyrolysis of petroleum oil with the production of valuable hydrocarbons, the steps comprising contacting vapor phase hydrocarbon material undergoing pyrolysis with a catalyst for a hydrocarbon-producing reaction involved in said pyrolysis thereby catalyzing said reaction, said catalyst being vaporized and dispersed in said vapor phase material by means of an electric arc and being capable of at least condensing under the temperature conditions of said pyrolysis, and preventing undesired decomposition of hydrocarbon material by the heating effect of said arc by contacting said arc with at most only a minor portion of said hydrocarbon material.

4. In the vapor phase pyrolysis of petroleum oil with the production of valuable hydrocarbons, the steps comprising contacting vapor phase hydrocarbon material undergoing pyrolysis with a finely divided solid catalyst for a hydrocarbon-producing reaction involved in said pyrolysis thereby catalyzing said reaction, said catalyst being vaporized and dispersed in said vapor phase material undergoing pyrolysis by means of an electric arc and being capable of solidifying under the temperature conditions of said pyrolysis; and preserving hydrocarbon material from undesired decomposition due to high arc temperatures by contacting said arc with at most only a minor portion of said material.

5. In the pyrolysis of hydrocarbon material in vapor phase with the production of valuable hydrocarbons in a cyclic process in which heat is stored in a gas-making path during a heating period in said cycle and the resulting stored heat employed for the pyrolysis of vapor phase hydrocarbon material in said gas-making path during a gas-making portion of said cycle, the steps comprising catalyzing a hydrocarbon-producing reaction involved in said pyrolysis by contacting vapor phase hydrocarbon material undergoing pyrolysis with a catalyst for said reaction, said catalyst being dispersed in said vapor phase material undergoing pyrolysis during said gas-making portion of said cycle by means of an electric arc; and minimizing decomposition of the hydrocarbon material involved in said pyrolysis due to the heating effect of said arc by contacting said arc with at most only a minor portion of said hydrocarbon material.

6. In the vapor phase pyrolysis of petroleum oil with the production of valuable hydrocarbons in a cyclic process in which heat is stored in a gas-making path during a heating period in said cycle and the resulting stored heat employed for the pyrolysis of vaporized petroleum oil in said gas-making path during a gas-making portion of said cycle, the steps comprising catalyzing a hydrocarbon-producing reaction involved in said pyrolysis by contacting vapor phase hydrocarbon material undergoing pyrolysis with a catalyst for said reaction, said catalyst being dispersed in said vapor phase material undergoing pyrolysis during said gas-making portion of said cycle by means of an electric arc; and minimizing decomposition of hydrocarbon material involved in said pyrolysis due to the heating effect of said arc by contacting said arc with at most only a minor portion of said hydrocarbon material.

7. In the vapor phase pyrolysis of petroleum oil with the production of valuable hydrocarbons in a cyclic process in which heat is stored in a gas-making path during a heating period in said cycle and the resulting stored heat employed for the vaporization and pyrolysis of petroleum oil in said gas-making path during a gas-making portion of said cycle, the steps comprising favoring a hydrocarbon-producing reaction involved in said pyrolysis by contacting vapor phase hydrocarbon material undergoing pyrolysis during said gas-making portion of said cycle with a catalyst for said reaction, said catalyst being dispersed by means of an electric arc into said vapor phase material intermediate the ends of said gas-making path; and minimizing hydrocarbon decomposition due to the heating effect of said arc by contacting said arc with at most only a minor portion of the hydrocarbon material involved in said pyrolysis.

NEWCOMB K. CHANEY.